United States Patent
Liu et al.

(10) Patent No.: US 11,284,453 B2
(45) Date of Patent: Mar. 22, 2022

(54) SLAVE DEVICE WITH FAST BLUETOOTH CONNECTION AND RESPONDING METHOD THEREOF

(71) Applicant: Audiowise Technology Inc., Hsinchu County (TW)

(72) Inventors: Hsinhsiang Liu, Sunnyvale, CA (US); Chih-Wei Sung, Hsinchu County (TW); Jing-Syuan Jia, Hsinchu County (TW); Kuang-Hu Huang, Hsinchu County (TW)

(73) Assignee: AUDIOWISE TECHNOLOGY INC., Hsinchu County (TW)

( * ) Notice: Subject to any disclaimer, the term of this patent is extended or adjusted under 35 U.S.C. 154(b) by 0 days.

(21) Appl. No.: 17/163,794

(22) Filed: Feb. 1, 2021

(65) Prior Publication Data

US 2021/0153266 A1    May 20, 2021

Related U.S. Application Data

(63) Continuation of application No. 17/013,893, filed on Sep. 8, 2020, now Pat. No. 10,939,481, which is a continuation of application No. 16/558,666, filed on Sep. 3, 2019, now Pat. No. 10,805,967.

(51) Int. Cl.
| | |
|---|---|
| *H04W 76/10* | (2018.01) |
| *H04B 1/713* | (2011.01) |
| *H04W 84/20* | (2009.01) |

(52) U.S. Cl.
CPC ............ *H04W 76/10* (2018.02); *H04B 1/713* (2013.01); *H04B 2201/71346* (2013.01); *H04W 84/20* (2013.01)

(58) Field of Classification Search
CPC ............. H04W 52/0209; H04W 76/10; H04W 12/003; H04W 36/0072; H04W 56/00; H04B 15/00; H04B 1/7156; H04B 1/713; H04B 7/269; H04L 1/1858
See application file for complete search history.

(56) References Cited

U.S. PATENT DOCUMENTS

| | | | |
|---|---|---|---|
| 2005/0097356 A1* | 5/2005 | Zilliacus | H04W 36/0066 726/4 |
| 2007/0287418 A1* | 12/2007 | Reddy | H04W 12/50 455/410 |
| 2015/0373760 A1* | 12/2015 | Palin | H04W 4/80 455/41.2 |
| 2016/0157078 A1* | 6/2016 | Palin | H04W 8/005 455/41.2 |

* cited by examiner

*Primary Examiner* — Khanh C Tran
(74) *Attorney, Agent, or Firm* — WPAT, PC

(57) ABSTRACT

There is provided a fast paging procedure in which a master device repeatedly sends the paging message to a slave device using predetermined channel frequencies, wherein a selection of the predetermined channel frequencies is not calculated or predicted from the slave's Bluetooth device address. When the master device receives a slave page response message at one frequency among the predetermined channel frequencies, the master device transmits an FHS packet to the slave device at the same frequency in which the slave page response message was received.

12 Claims, 5 Drawing Sheets

SLAVE DEVICE WITH FAST BLUETOOTH CONNECTION AND RESPONDING METHOD THEREOF

CROSS REFERENCE TO RELATED APPLICATION

The present application is a continuation application of U.S. Ser. No. 17/013,893, filed on Sep. 8, 2020, which is a continuation application of U.S. Ser. No. 16/558,666, filed on Sep. 3, 2019, the disclosure of which is hereby incorporated by reference herein in its entirety.

BACKGROUND

1. Field of the Disclosure

This disclosure generally relates to the Bluetooth connection, more particularly, to a fast and simplified paging procedure to set up an initial connection between a master and a slave without using estimated or predicted clock frequencies.

2. Description of the Related Art

In the Bluetooth connection procedure, the page substate is used by the master to activate and connect to a slave in a page scan substate. The master tries to coincide with the slave's scan activity by repeatedly transmitting the paging message consisting of the slave's device access code (DAC) in different hop channels. Since the Bluetooth clocks of the master and the slave are not synchronized, the master does not know exactly when the slave wakes up and on which hop frequency. Therefore, the master transmits a train of identical page scan messages at different hop frequencies and listens in between the transmit intervals until it receives a response from the slave.

The conventional initial messaging between a master and a slave is shown in FIGS. 1 and 2. The master calculates 32 hop frequencies using the slave's Bluetooth device address (BD_ADDR), and f(k) and f(k+1) used in a current slot as shown in FIGS. 1-2 are estimated from the slave's Bluetooth clock. This estimate can be derived from timing information that was exchanged during the last encounter with this particular device, or from an inquiry procedure. With this estimate CLKE of the slave's Bluetooth clock, the master can predict on which hop channel, e.g. f(k), the slave starts page scanning.

It is seen from FIGS. 1 and 2 that when successfully receiving a paging message in step 1, the slave replies a slave page response message to the master at the response hop frequency f'(k) or f'(k+1) that corresponds to the hop frequency f(k) or f(k+1) in which the paging message was received. When successfully receiving the slave page response message in step 2, the master transmits an FHS packet in step 3 containing the master's real-time Bluetooth clock, the master's BD_ADDR, the BCH parity bits, and the class of device at a next hop frequency f(k+1) or f(k+2) determined by frequency hopping.

Conventionally, the page hopping sequence is divided over two paging trains A and B of 16 frequencies. Train A includes the 16 hop frequencies surrounding the current, predicted hop frequency f(k), where k is determined by the clock estimate $CLKE_{16-12}$. The first train consists of hops f(k−8), f(k−7), . . . , f(k), . . . , f(k+7). Since the master does not know when the slave will enter the page scan substate, the master has to repeat this train A for $N_{page}$ times or until a response is obtained. When the difference between the Bluetooth clocks of the master and the slave is less than −8×1.28 s or larger than +7×1.28 s, the remaining 16 hops are used to form the new 10 ms train B. Train B consists of hops f(k−16), f(k−15), . . . , f(k−9), f(k+8) . . . , f(k+15). Train B shall be repeated for $N_{page}$ times. If no response is obtained, train A shall be tried again $N_{page}$ times.

Since alternate use of train A and train B shall be continued until a response is received or the timeout is exceeded, slow connection can occur. That can reduce the user experience in some scenarios.

Accordingly, it is necessary to shorten a time interval required to set up a link in some specific cases such as a quick point-to-point link reconnection if it is lost during streaming.

SUMMARY

The present disclosure provides a fast paging procedure in the Bluetooth initial connection without frequency hopping based on estimated hop frequencies.

The present disclosure provides a responding method of a slave device, which connects to a master device by Bluetooth connection. The responding method includes the steps of: listening, from the master device, a paging message sequentially sent at multiple predetermined frequencies in a predetermined sequence; responding a slave page response message at one frequency among the multiple predetermined frequencies to the master device; receiving, from the master device, a frequency hop synchronization (FHS) packet sent at the same frequency responding the slave page response message; and responding another page response message at the same frequency receiving the FHS packet to the master device.

The present disclosure further provides a slave device connects to a master device by Bluetooth connection. The slave device is configured to receive a paging message and a frequency hop synchronization (FHS) packet as well as respond page response messages at a same frequency among multiple predetermined frequencies.

The present disclosure further provides a responding method of a slave device, which connects to a master device by Bluetooth connection. The responding method includes the steps of: listening, from the master device, a paging message sequentially sent from a first frequency to a last frequency among multiple predetermined frequencies in a fixed sequence; responding a slave page response message at one frequency among the multiple predetermined frequencies to the master device; receiving, from the master device, a frequency hop synchronization (FHS) packet sent at the same frequency responding the slave page response message; and responding another page response message at the same frequency receiving the FHS packet to the master device.

In the present disclosure, a master device sends the paging message at a fewer predetermined channel frequencies and a slave device in a page scan substate only needs to scan said fewer predetermined channel frequencies, it is able to take a fewer time before entering a connection state compared to a regular Bluetooth system, which determines a page hopping sequence according to the slave's BD_ADDR.

The fast paging in the present disclosure is referred to a simplified page procedure to facilitate link establishment by using less RF channels. As fewer predetermined frequencies (i.e. RF channels) are used, a shorter link time is realized and no CLK estimation is required anymore. Furthermore, these predetermined frequencies may or may not be selected from the conventional 32 page hopping frequencies in regular Bluetooth connection procedure.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
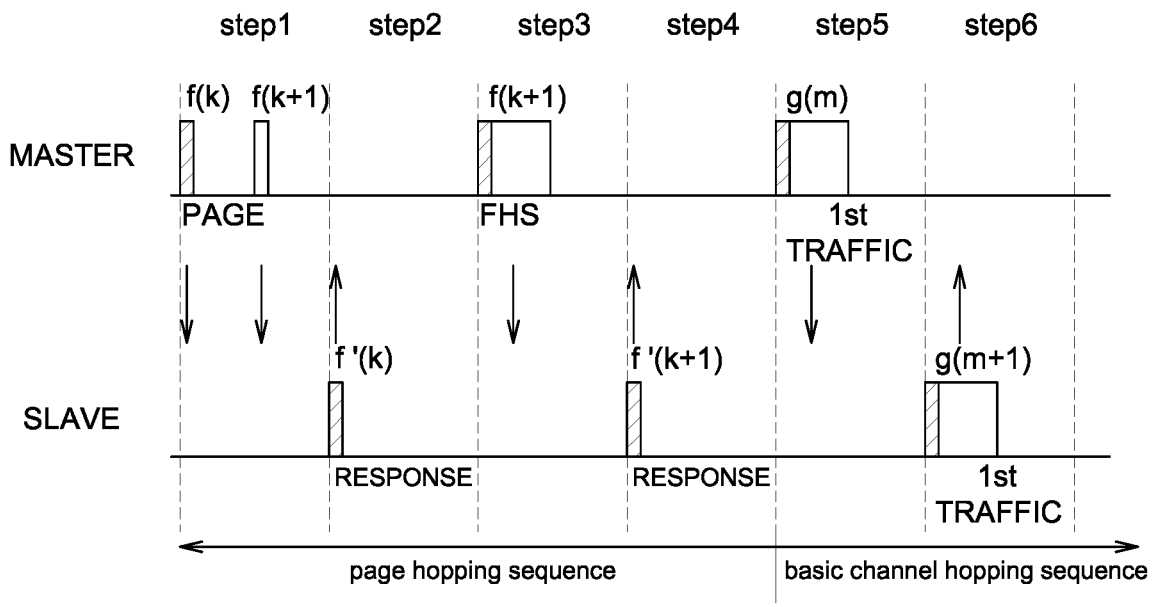
FIG. 1 is a schematic diagram of the conventional paging procedure in which the slave responds to the first paging message.
Figure 2:
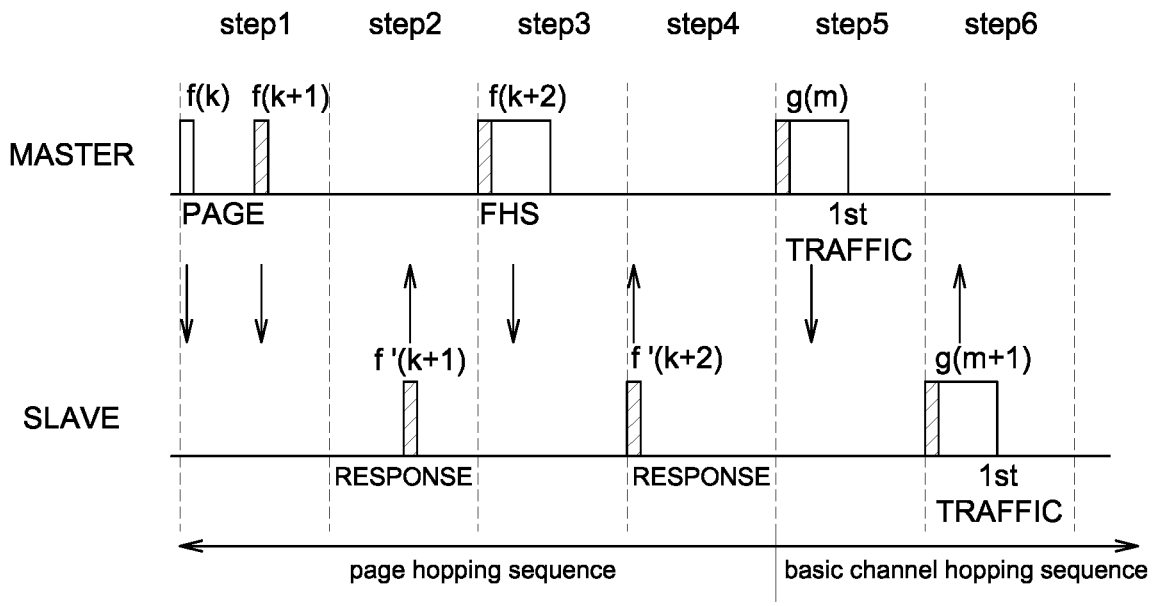
FIG. 2 is a schematic diagram of the conventional paging procedure in which the slave responds to the second paging message.
Figure 3:
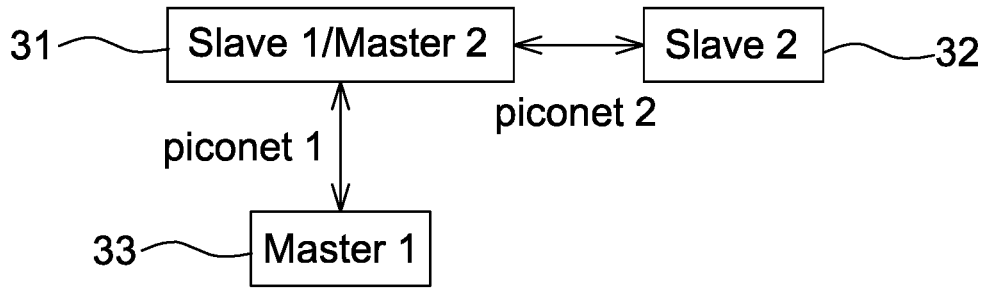
FIG. 3 is a schematic block diagram of a Bluetooth system adopting a fast paging procedure of the present disclosure.

One objective of the present disclosure is to facilitate the setup of an initial connection between a master device 31 and a slave device 32 of a Bluetooth system without estimating the slave's Bluetooth clock according to the Bluetooth device address (BD_ADDR) of the slave device 32. FIG. 3 is a block diagram of a Bluetooth system adopting a fast paging procedure of the present disclosure.

In one non-limiting embodiment, the paging procedure of the present disclosure is applied to an application requiring fast Bluetooth connection. For example, the master device 31 of the present disclosure is operated as both a secondary master (Master 2 shown in FIG. 3) and a primary slave (Slave 1 shown in FIG. 3). The master device 31 is one of a pair of Bluetooth earphones, and the slave device 32 is the other one of said pair of Bluetooth earphones.

FIG. 3 shows that the master device 31 and the slave device 32 are used to form a piconet 2; meanwhile, the master device 31 is further used to form a piconet 1 with a primary master 33 before the piconet 2 is formed. That is, in forming the piconet 2 the master device 31 already has a synchronous link with the primary master 33 (e.g., a smartphone or recording pen shown as Master 1 in FIG. 3) to receive audio signals therefrom. Accordingly, the initial connection between the master device 31 and the slave device 32 is not allowed to use synchronous slots between the master device 31 and the primary master 33. If the conventional paging procedure is used, it may take a longer time to set up the initial connection since fewer time slots are allowed to be used for the connection between the master device 31 and the slave device 32.

In the case that the piconet 2 is set up before the piconet 1, the fast paging procedure of the present disclosure is no longer necessary, i.e. the page substate and the page scan substate mentioned below no longer being entered.

The present disclosure is further applicable to a quick point-to-point link reconnection if it is lost during streaming.

Figure 4:
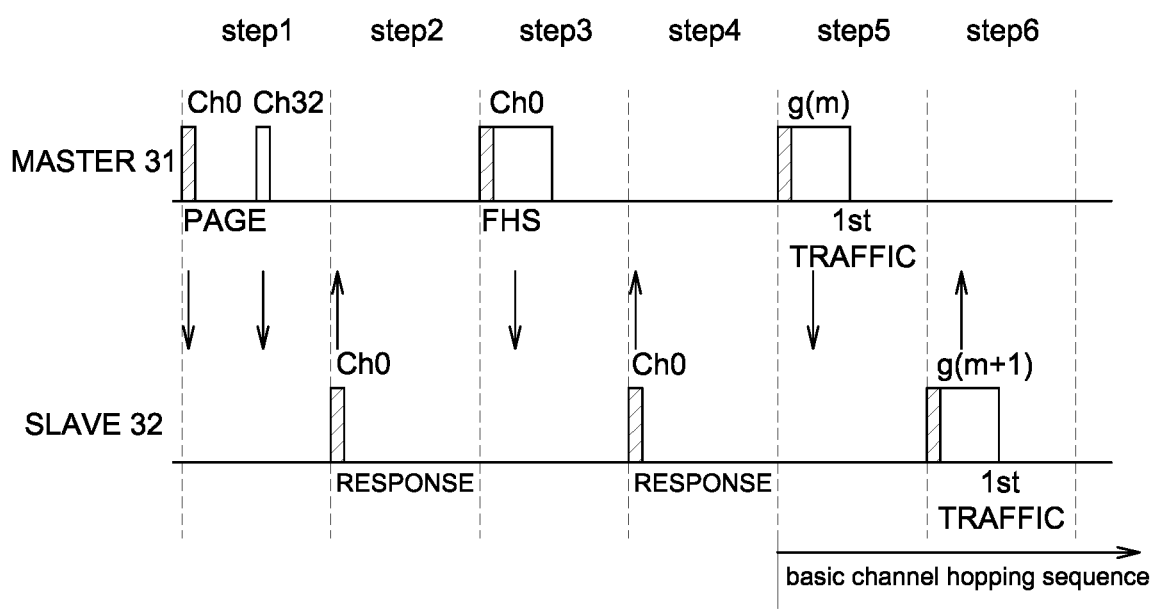
FIG. 4 is a schematic diagram of a paging procedure according to one embodiment of the present disclosure, in which a slave device responds to a paging message at a first predetermined frequency.
Figure 5:
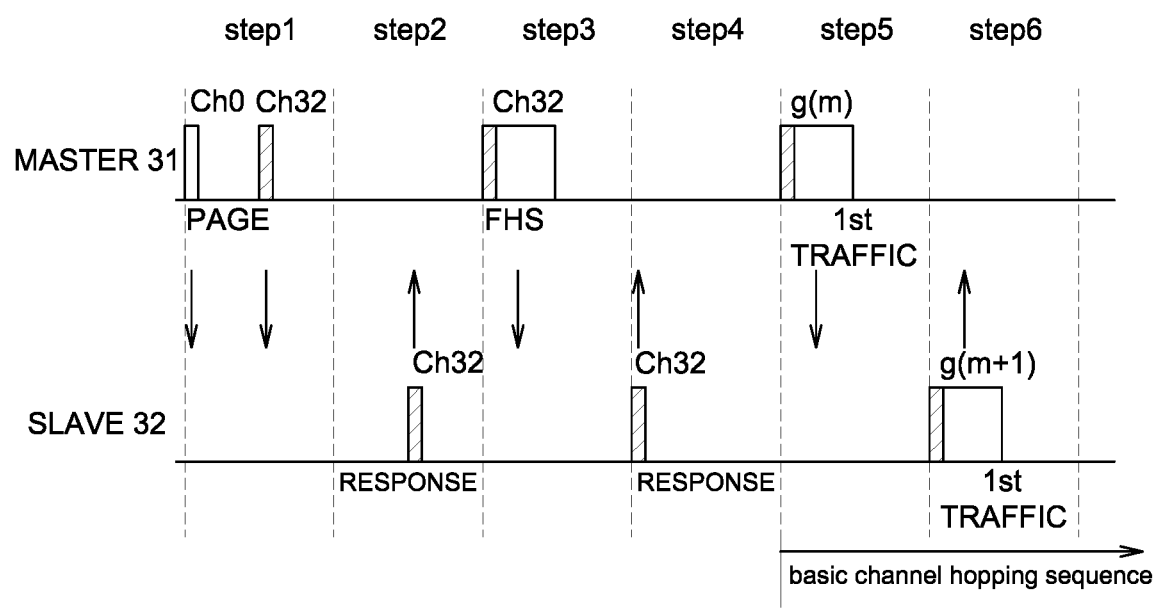
FIG. 5 is a schematic diagram of a paging procedure according to one embodiment of the present disclosure, in which a slave device responds to a paging message at a second predetermined frequency.

Referring to FIGS. 4 and 5, they are schematic diagrams of a paging procedure of a Bluetooth connection method used in a Bluetooth system according to some embodiments of the present disclosure. It is shown that the slave device 32 receives a paging message at a first predetermined frequency Ch0 (e.g., FIG. 4) or at a second predetermined frequency Ch32 (e.g., FIG. 5), and then responds a slave page response message at the first predetermined frequency Ch0 or at the second predetermined frequency Ch32.

In step 1, after the inquiry procedure, the master device 31 is in a page substate and the slave device 32 is in a page scan substate. The master device 31 repeatedly transmits, e.g., via a Bluetooth antenna thereof, a paging message PAGE sequentially (the used frequency being changed every 312.5 μs) at multiple predetermined frequencies. For example, in FIGS. 4 and 5, a number of the multiple predetermined frequencies is set as 2, and said 2 frequencies, e.g., Ch0 and Ch32 herein, are set previously and fixed at channels 0 and 32 among 79 radio frequency (RF) channels of basic piconet physical channels of Bluetooth. However, the present disclosure is not limited thereto, and the 2 frequencies are set previously and fixed at channels 16 and 64 or other pairs among or not among the 79 RF channels of basic piconet physical channels of Bluetooth without particular limitations.

To facilitate the initial connection, the multiple predetermined frequencies are not calculated or predicted by the master device 31 using a Bluetooth device address (BD_ADDR) of the slave device 32, which is obtained during the last encounter with the slave device 32 or from an inquiry procedure. Preferably, the multiple predetermined frequencies, e.g., Ch0 and Ch32 herein, are selected before shipment of the master device 31 and the slave device 32 and respectively defined therein. The paging messages PAGE in FIGS. 4 and 5 are identical and include a device access code (DAC) of the slave device 32, which is also obtained during the last encounter with the slave device 32 or from an inquiry procedure.

In FIGS. 4 and 5, a paging message PAGE is firstly transmitted at frequency Ch0 and then transmitted at frequency Ch32 separated by 312.5 μs, but the present disclosure is not limited thereto. In another aspect, the master device 31 transmits the paging message PAGE at frequency Ch32 at first and then at frequency Ch0.

Step 2 (also referred to a slave response substate): The slave device 32 listens the paging message PAGE at one of the multiple predetermined frequencies, e.g., Ch0 and Ch32 herein, for e.g., 1.28 second sent in the transmit interval of the master device 31, but not limited thereto as long as it is longer than 10 ms. As only two channels are listened, the slave device 32 can quickly receive the paging message PAGE at the channel thereof. On receiving the paging message PAGE at one frequency among the multiple predetermined frequencies, the slave device 32 responds, e.g., via a Bluetooth antenna thereof, a slave page response message at said one frequency (i.e. the frequency that the slave device 32 receives the paging message PAGE) among the multiple predetermined frequencies to the master device 31 in the RX slot of the master device 31 in step 2. The slave page response message also contains the device access code of the slave device 32.

Step 3 (also referred to a master response substate): When receiving the slave page response message in step 2, the master device 31 then transmits an FHS packet in step 3 to the slave device 32 at the same frequency receiving the slave page response message. The FHS packet contains the Bluetooth device address and the clock of the master device 31 to be provided to the slave device 32. For example, in FIG. 4 the slave device 32 sends the slave page response message at frequency Ch0 in step 2, and then the master device 31 transmits the FHS packet at the frequency Ch0 in step 3; whereas, in FIG. 5 the slave device 32 sends the slave page response message at frequency Ch32 in step 2, and then the master device 31 transmits the FHS packet at the frequency Ch32 in step 3.

Step 4 (also referred to slave response substate): After receiving the FHS packet in step 3, the slave device 32 responds in step 4 another page response message (also containing slave's BD_ADDR) at the same frequency, e.g., Ch0 in FIG. 4 and Ch32 in FIG. 5, receiving the FHS packet to the master device 31 to acknowledge reception of the FHS packet.

In step 5, the master device 31 and the slave device 32 both enter a connection state, and the master device 31 transmits a POLL packet using a new hopping sequence determined according to a Bluetooth device address of the master device 31 after receiving the acknowledgement indicating by the another page response message transmitted by the slave device 32 in step 4. The determination of the basic channel hopping sequence is based on the regular setting of Bluetooth communication, and thus details thereof are not described herein.

The time slot of every step from step 1 to step 6 is set as 625 µs. Details of the FHS packet and the POLL packet are known to the art, and thus details thereof are not described herein.

Figure 6:
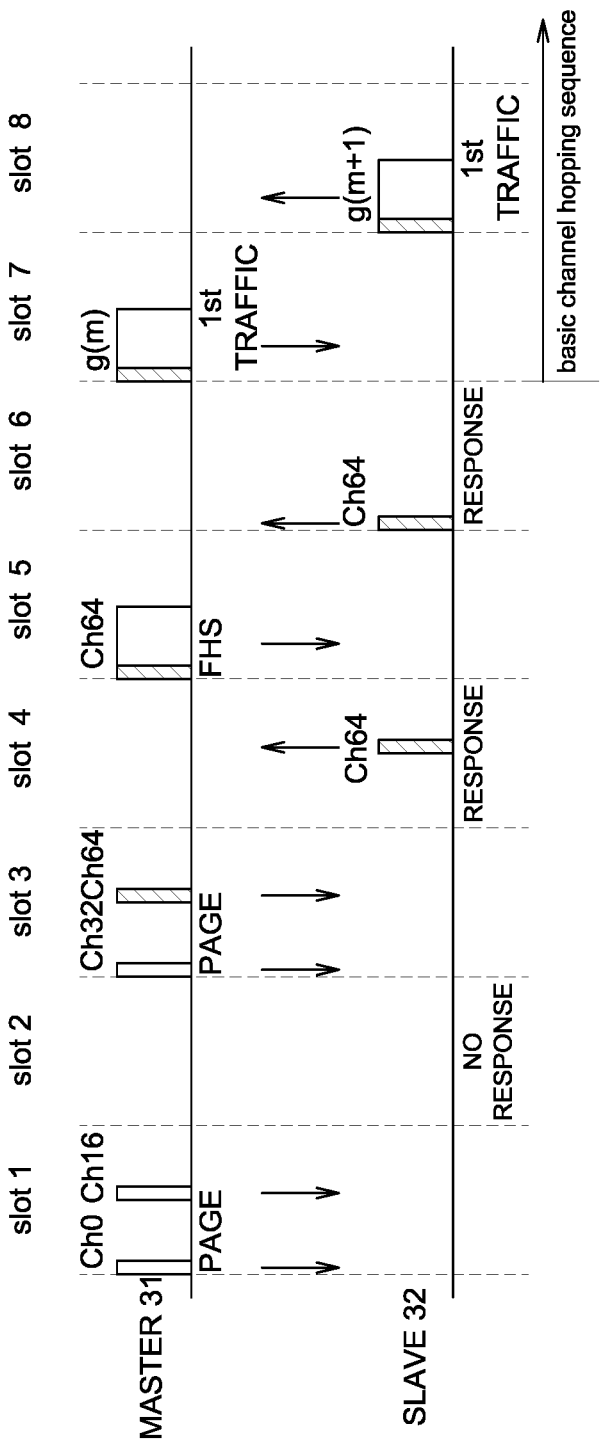
FIG. 6 is a schematic diagram of a paging procedure according to another embodiment of the present disclosure, in which a slave device responds to a paging message at a fourth predetermined frequency.

Referring to FIG. 6, it is a schematic diagram of a paging procedure of a Bluetooth connection method used in a Bluetooth system according to another embodiment of the present disclosure, in which a slave device 32 responds to a paging message at a fourth predetermined frequency. In FIG. 6, a number of the multiple predetermined frequencies (or channels) is set as 4, and the slave device 32 does not respond a slave page response message to the master device 31 at the frequency Ch0, Ch16 or Ch32 in this embodiment.

Preferably, in the present disclosure the multiple predetermined frequencies are selected equally over the 79 RF channels of basic piconet physical channels of regular Bluetooth. The reason to separate the multiple predetermined frequencies as far as possible is to avoid interference from WiFi signal, noises and other Bluetooth links. For example, the 4 frequencies are set previously and fixed at channels 0, 24, 48 and 72 among the 79 RF channels of basic piconet physical channels of regular Bluetooth, but not limited thereto.

In the case that the multiple predetermined frequencies include more than 2 frequencies, the master device 31 is arranged to transmit a paging message PAGE sequentially from a first frequency to a last frequency (changing every 312.5 µs in TX slots) among the multiple predetermined frequencies, and the paging message PAGE is transmitted always starting from the first frequency.

For example, if the first frequency is a lowest frequency among the multiple predetermined frequencies, e.g., Ch0, Ch16, Ch32 and Ch64, the master device 31 transmits the paging message PAGE starting from the frequency Ch0, and then transmits the paging message PAGE at frequencies in a sequence of Ch16, Ch32 and Ch64 every 312.5 µs in TX slots, and repeatedly in a fixed sequence Ch0, Ch16, Ch32 and Ch64 if no response is received.

FIG. 6 shows that the master device 31 sequentially transmits the paging message PAGE at frequencies Ch0 and Ch16 in slot 1. If the master device 31 does not receive a response in slot 2, the master device 31 further sequentially transmits the paging message PAGE at frequencies Ch32 and Ch64 in slot 3 till a response from the slave device 32 is received, e.g., FIG. 6 showing the slave device 32 receives the paging message at the frequency Ch64 in slot 3 and a slave page response message being received at the frequency Ch64 in slot 4. If a response is not received in slot 4, the master device 31 transmits the paging message PAGE from the frequency Ch0 again in the next slot till the paging procedure is shut down or a response is received.

On the other hand, if the first frequency is a highest frequency among the multiple predetermined frequencies, e.g., Ch0, Ch16, Ch32 and Ch64, the master device 31 transmits the paging message PAGE starting from the frequency Ch64, and then transmits the paging message PAGE at frequencies in a sequence of Ch32, Ch16 and Ch0 every 312.5 µs in TX slots, and repeatedly in a fixed sequence Ch64, Ch32, Ch16 and Ch0 if no response is received.

In the present disclosure, a start frequency (e.g., the first frequency) is selected from any one of the multiple predetermined frequencies as long as it is determined previously. A sequence from the start frequency to the last frequency among the multiple predetermined frequencies is a fixed pattern (e.g., from low to high or from high to low) or a random pattern in every fast paging procedure.

Figure 7:
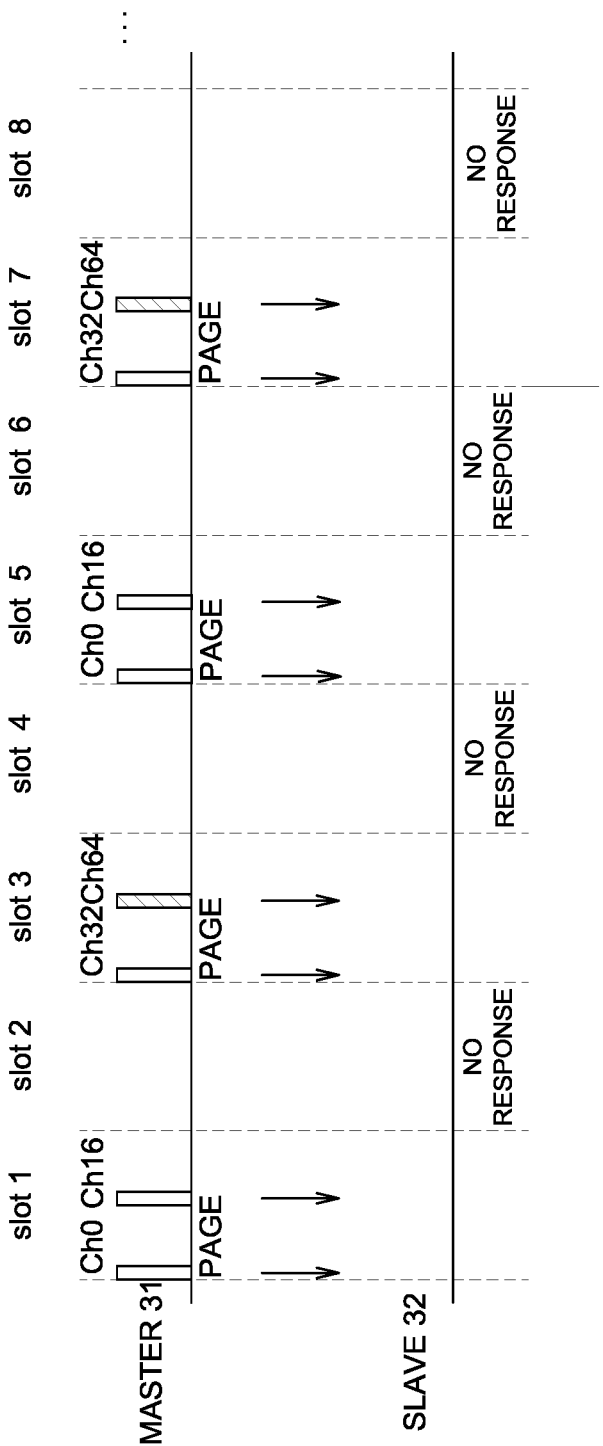
FIG. 7 is a schematic diagram of a paging procedure according to an alternative embodiment of the present disclosure, in which a master device does not receive a response message from a slave device.

Please referring to FIG. 7, it shows that if the master device 31 does not receive any response message from the slave device 32, the master device 31 repeatedly transmits the paging message PAGE at the multiple predetermined frequencies till a response message is received.

In the present disclosure, the paging message PAGE is transmitted always starting from the first frequency, and the start frequency (e.g. Ch0 in slot 1 of FIGS. 3-6) is not calculated or predicted from any message received from the slave device 32. The slave device 32 either receives the paging message PAGE at one of the multiple predetermined frequencies, or changes to another frequency every 1.28 µs.

Then, the master device 31 listens a slave page response message in slot 4 sent at one of the multiple predetermined frequencies, e.g., Ch64 shown in FIG. 6, and then transmits an FHS packet in slot 5 at the same frequency, e.g., Ch64 shown in FIG. 6, which the slave page response message is sent in slot 4. The slave device 32 responds another page response message in slot 6 to acknowledge reception of the FHS packet.

In slot 7, the master device 31 and the slave device 32 enter a connection state. The master device 31 transmits a POLL packet as a first traffic in slot 7, and the slave device 32 responds any type of packet to the master device 31 in slot 8 as a response traffic. As mentioned above, the determination of frequencies of g(m) and g(m+1) utilizes the basic channel hopping sequence based on regular Bluetooth paging procedure.

It should be mentioned that in the present disclosure, the determination of whether the master device 31 and slave device 32 receive a transmitted message from the opposite side is identical to the regular Bluetooth paging procedure, and thus details thereof are not described herein.

As mentioned above, in the regular Bluetooth paging procedure, the master has to estimate the slave's Bluetooth clock and changes the frequency in different transmit slots based on page hopping sequence. Due to the channel drift of the slave and a large amount of hoping frequencies and TX slots being used, it may be time consuming to set up a connection. Accordingly, the present disclosure further provides a Bluetooth system (e.g., FIG. 3) and a paging method thereof (e.g., FIGS. 4-6) that use fewer TX slots and fewer predetermined frequencies not calculated or predicted from the slave's Bluetooth device address (BD_ADDR) to transmit the paging message, response message and FHS packet to facilitate the initial connection between the master and slave.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A responding method of a slave device in a page scan substate, the slave device connecting to a master device by Bluetooth connection, the responding method comprising:
   listening, from the master device, a paging message sequentially sent at multiple predetermined frequencies in a predetermined sequence;
   responding a slave page response message at one frequency among the multiple predetermined frequencies to the master device;
   receiving, from the master device, a frequency hop synchronization (FHS) packet sent at the same frequency responding the slave page response message; and
   responding another page response message at the same frequency receiving the FHS packet to the master device,
   wherein the multiple predetermined frequencies has a number of 2, 4 or 8 frequencies.

2. The responding method as claimed in claim 1, wherein the paging message and the slave page response message comprise a device access code (DAC) of the slave device.

3. The responding method as claimed in claim 1, wherein the multiple predetermined frequencies are not calculated from a Bluetooth device address of the slave device.

4. The responding method as claimed in claim 1, wherein the 4 frequencies are set previously and fixed at channels 0, 16, 32 and 64 or 0, 24, 48 and 72 among 79 RF channels of basic piconet physical channels of Bluetooth.

5. The responding method as claimed in claim 1, wherein the 2 frequencies are set previously and fixed at channels 0 and 32, at channels 0 and 24, at channels 16 and 64 or at channels 48 and 72 among 79 RF channels of basic piconet physical channels of Bluetooth.

6. A responding method of a slave device in a page scan substate, the slave device connecting to a master device by Bluetooth connection, the responding method comprising:
   listening, from the master device, a paging message sequentially sent at multiple predetermined frequencies in a predetermined sequence;
   responding a slave page response message at one frequency among the multiple predetermined frequencies to the master device;
   receiving, from the master device, a frequency hop synchronization (FHS) packet sent at the same frequency responding the slave page response message; and
   responding another page response message at the same frequency receiving the FHS packet to the master device,
   wherein the multiple predetermined frequencies are selected equally over 79 RF channels of basic piconet physical channels of Bluetooth.

7. A slave device, connecting to a master device by Bluetooth connection, the slave device being configured to
   receive a paging message and a frequency hop synchronization (FHS) packet as well as respond page response messages at a same frequency among multiple predetermined frequencies,
   wherein the multiple predetermined frequencies has a number of 2, 4 or 8 frequencies.

8. The slave device as claimed in claim 7, wherein the multiple predetermined frequencies are selected before shipment of the slave device.

9. The slave device as claimed in claim 7, wherein the multiple predetermined frequencies are not calculated from a Bluetooth device address of the slave device.

10. The slave device as claimed in claim 7, wherein the 4 frequencies are set previously and fixed at channels 0, 16, 32 and 64 or 0, 24, 48 and 72 among 79 RF channels of basic piconet physical channels of Bluetooth.

11. The slave device as claimed in claim 7, wherein the 2 frequencies are set previously and fixed at channels 0 and 32, at channels 0 and 24, at channels 16 and 64 or at channels 48 and 72 among 79 RF channels of basic piconet physical channels of Bluetooth.

12. A slave device, connecting to a master device by Bluetooth connection, the slave device being configured to
   receive a paging message and a frequency hop synchronization (FHS) packet as well as respond page response messages at a same frequency among multiple predetermined frequencies,
   wherein the multiple predetermined frequencies are selected equally over 79 RF channels of basic piconet physical channels of Bluetooth.

* * * * *